(12) United States Patent
Ankaiah et al.

(10) Patent No.: US 9,414,289 B2
(45) Date of Patent: Aug. 9, 2016

(54) PREDICTIVE CLIENT VLAN EXTENSION

(71) Applicant: Avaya Inc., Basking Ridge, NJ (US)

(72) Inventors: Shashi Hosakere Ankaiah, Bangalore (IN); Vivek L Atreya, Bangalore (IN); Seemant Choudhary, Fremont, CA (US)

(73) Assignee: Avaya Inc., Santa Clara, CA (US)

( * ) Notice: Subject to any disclaimer, the term of this patent is extended or adjusted under 35 U.S.C. 154(b) by 105 days.

(21) Appl. No.: 14/138,105

(22) Filed: Dec. 22, 2013

(65) Prior Publication Data

US 2015/0181408 A1 Jun. 25, 2015

(51) Int. Cl.
*H04W 4/00* (2009.01)
*H04W 36/32* (2009.01)

(52) U.S. Cl.
CPC .................................... *H04W 36/32* (2013.01)

(58) Field of Classification Search
USPC ................ 370/338, 331, 328, 329, 352, 468; 455/432.1, 453, 433, 436, 438, 442, 455/445
See application file for complete search history.

(56) References Cited

U.S. PATENT DOCUMENTS

| 5,920,699 | A  | * | 7/1999 | Bare | .............................. 709/225 |
| 8,218,502 | B1 | * | 7/2012 | Liu  | ..................... H04W 76/022 370/331 |

* cited by examiner

*Primary Examiner* — Chi H Pham
*Assistant Examiner* — Alexander O Boakye

(57) ABSTRACT

Methods, systems and computer readable media for predictive client VLAN extension are described. In some implementations, the method can include determining client movement within a wireless network domain. The method can also include predicting one or more next hop access points for the client. The method can further include extending a client network to the one or more next hop access points prior to the client roaming to the one or more next hop access points.

16 Claims, 4 Drawing Sheets

100

PREDICTIVE CLIENT VLAN EXTENSION

TECHNICAL FIELD

Embodiments relate generally to computer networks, and more particularly, to methods, systems and computer readable media for predictive client VLAN extension.

BACKGROUND

Client roaming performance in wireless networks can be an important factor for providing a quality voice/video network experience. In centralized WLAN architectures, client roaming procedures can be broadly classified into control plane procedures (e.g., client association and authentication) and data path setup procedures (e.g., L2/L3 roaming).

Historically, control plane procedures may have contributed the most to roaming delays. However advances in control plane roaming algorithms have reduced control plane roaming times to the 10-20 millisecond range, while data plane setup may still take 30-100 milliseconds. There may be a desire for a mechanism to speed up data plane setup.

Embodiments were conceived in light of the above mentioned needs, problems and/or limitations, among other things.

SUMMARY

One or more embodiments can include methods, systems and computer readable media for predictive client VLAN extension. In some implementations, the method can include determining client movement within a wireless network domain. The method can also include predicting one or more next hop access points for the client. The method can further include extending a client network to the one or more next hop access points prior to the client roaming to the one or more next hop access points.

The client network can include a VLAN. The method can also include identifying one or more active clients within the wireless network domain that may benefit from predictive VLAN extension. The identifying can include one or more of identifying any clients that support a fast roaming mechanism, a security mode configured for an SSID to which a client is connected, and identifying a non-sticky client that will roam.

The method can further include for each of the one or more active clients that may benefit from predictive VLAN extension, determining if a VLAN for that client needs to be extended based on one or more of received signal strength indication (RSSI) of a current access point of that client, an RSSI value of one or more neighboring access points and an RSSI velocity. Predicting one or more next hop access points for the client is based on one or more of: RF neighbors of an access point to which the client is currently associated, access points to which the client is pre-authenticated, RF neighbor report, client location tracking and RSSI velocity and location tracking software.

The method can also include sending a message from a wireless controller to one or more next hop access points to extend a client VLAN. The method can further include programming, at one or more access points, an access tunnel and a mobility tunnel extension in a client VLAN, wherein the extension ages out and is removed if the client does not connect to the extension within a predetermined time period.

The method can also include communicating the one or more next hop access points to the client. The method can further include communicating a next hop access point to the client.

Some implementations can include a system comprising one or more processors configured to perform operations. The operations can include determining client movement within a wireless network domain. The operations can also include predicting one or more next hop access points for the client. The operations can further include extending a client VLAN network to the one or more next hop access points prior to the client roaming to the one or more next hop access points.

The operations can also include identifying one or more active clients within the wireless network domain that may benefit from predictive VLAN extension. The identifying can include one or more of identifying any clients that support a fast roaming mechanism, a security mode configured for an SSID to which a client is connected, and identifying a non-sticky client that will roam.

The operations can further include, for each of the one or more active clients that may benefit from predictive VLAN extension, determining if a VLAN for that client needs to be extended based on one or more of received signal strength indication (RSSI) of a current access point of that client, an RSSI value of one or more neighboring access points and an RSSI velocity. Predicting one or more next hop access points for the client can be based on one or more of: RF neighbors of an access point to which the client is currently associated, access points to which the client is pre-authenticated, RF neighbor report, client location tracking and RSSI velocity and location tracking software.

The operations can also include programming, at one or more access points, an access tunnel and a mobility tunnel extension in a client VLAN, wherein the extension ages out and is removed if the client does not connect to the extension within a predetermined time period.

Some implementations can include a nontransitory computer readable medium having stored thereon software instructions that, when executed by a processor, cause the processor to perform operations. The operations can include determining client movement within a wireless network domain. The operations can also include predicting one or more next hop access points for the client. The operations can further include extending a client network to the one or more next hop access points prior to the client roaming to the one or more next hop access points.

The client network can include a VLAN. The operations can also include identifying one or more active clients within the wireless network domain that may benefit from predictive VLAN extension. The identifying can include one or more of identifying any clients that support a fast roaming mechanism, a security mode configured for an SSID to which a client is connected, and identifying a non-sticky client that will roam.

The operations can further include for each of the one or more active clients that may benefit from predictive VLAN extension, determining if a VLAN for that client needs to be extended based on one or more of received signal strength indication (RSSI) of a current access point of that client, an RSSI value of one or more neighboring access points and an RSSI velocity. Predicting one or more next hop access points for the client is based on one or more of: RF neighbors of an access point to which the client is currently associated, access points to which the client is pre-authenticated, RF neighbor report, client location tracking and RSSI velocity and location tracking software.

The operations can also include sending a message from a wireless controller to one or more next hop access points to extend a client VLAN. The operations can further include programming, at one or more access points, an access tunnel and a mobility tunnel extension in a client VLAN, wherein the extension ages out and is removed if the client does not connect to the extension within a predetermined time period.

DETAILED DESCRIPTION

In general, systems, methods and nontransitory computer readable media for predictive VLAN extension in a WLAN network can be configured to extend a client VLAN well in advance of a roaming so as to decrease client roaming delays in the network. Decreased roaming delays can result in improved voice/video call support over the WLAN. To accomplish the predictive extension, a list of probable access points (APs) to which the client could roam to can be generated. Optionally, the client can be informed of the list probable roaming access points (e.g., when the client supports a standard such as 802.11k and/or 802.11v).

Figure 1:
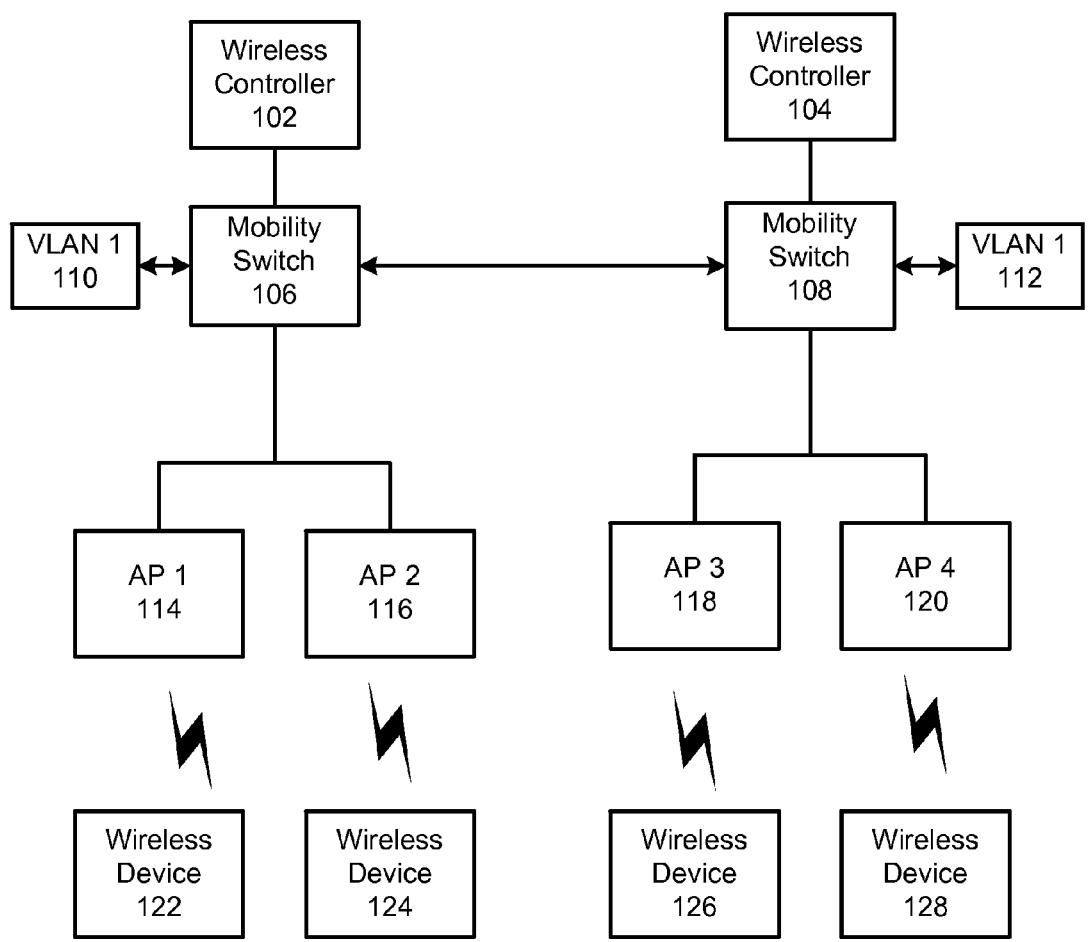
FIG. 1 is a diagram of an example network in accordance with at least one implementation.

As shown in FIG. 1, an example wireless network 100 (e.g., enterprise WLANs) includes wireless controllers (102 and 104) connected to respective mobility switches (or unified switches) 106 and 108. Each mobility switch (106 and 108) is connected to a respective VLAN (or MVLAN) 110, 112 and serves as the gateway for its corresponding VLAN (there can be more than one mobility switch or unified switch in each VLAN, but only one per VLAN will be designated as the gateway). Access points 114-120 are connected to corresponding unified switches 106, 108. Client devices 122-128 connect to the network via one of the access points 114-120.

In the network 100, an overlay deployment model can be used in which wireless control plane (WCP) functions and wireless switching plane (WSP) functions are collocated in a single wireless controller (e.g., 102 and 104). Alternatively, a split-plane architecture can be used in which the WCP functions are decoupled from the WSP functions into separate devices.

WCP functions can be implemented in a virtual appliance or on actual hardware. A device that implements only WCP functionality can be referred to as a wireless control point.

WSP functions can be integrated into L2/L3 stackable and/or core switches. Also, WSP functions can be provided on WCP-managed WSPs in some enterprise configurations.

Figure 2:
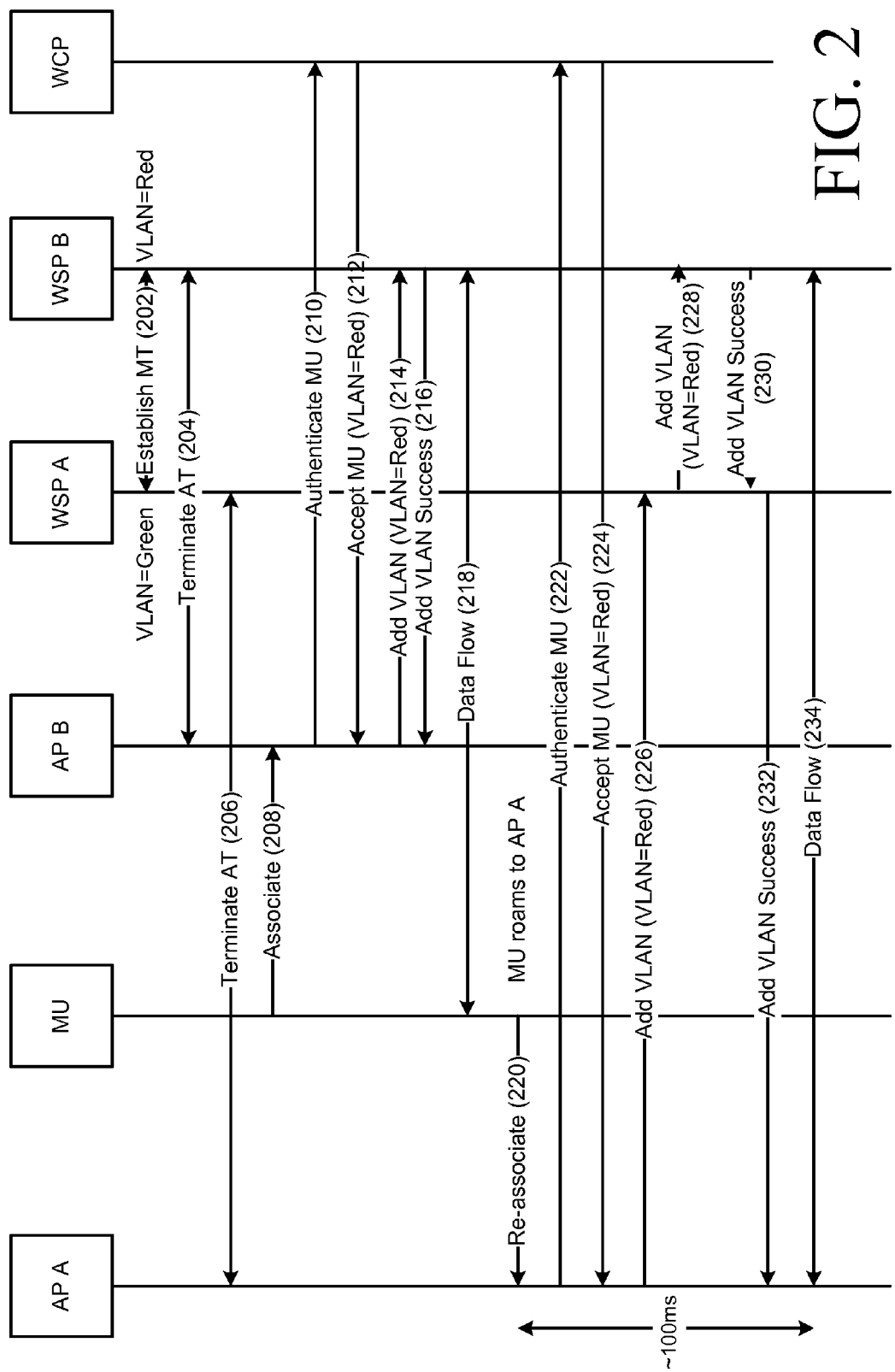
FIG. 2 is a diagram of an example VLAN extension without client mobility prediction.

FIG. 2 is a diagram of an example VLAN extension without client mobility prediction. As shown in FIG. 2, at 202, a mobility tunnel (MT) is established between WSP A and WSP B, and VLAN Green and VLAN Red, respectively.

At 204, an access tunnel from WSP B is terminated at AP B.

At 206, an access tunnel from WSP A is terminated at AP A.

At 208, a mobile user device (MU) associates with AP B.

At 210, the mobile user is authenticated.

At 212, the mobile user is accepted and seeks to connect to the Red VLAN.

At 214, AP B adds the Red VLAN.

At 216, the Red VLAN is successfully added.

At 218, data flows between MU and WSP B.

At 220, MU re-associates to AP A (e.g., MU roams to AP A).

At 222, AP A authenticates MU with WCP.

At 224, the MU is accepted.

At 226, AP A seeks to add Red VLAN.

At 228, WSP A seeks to add Red VLAN with WSP B.

At 230, Red VLAN is successfully added to WSP A.

At 232, WSP A acknowledges successfully adding Red VLAN.

At 234, data flows between WSP B and AP A.

In this example, a delay of about 100 ms occurs between roaming 220 and the start of data flow 234.

Figure 3:
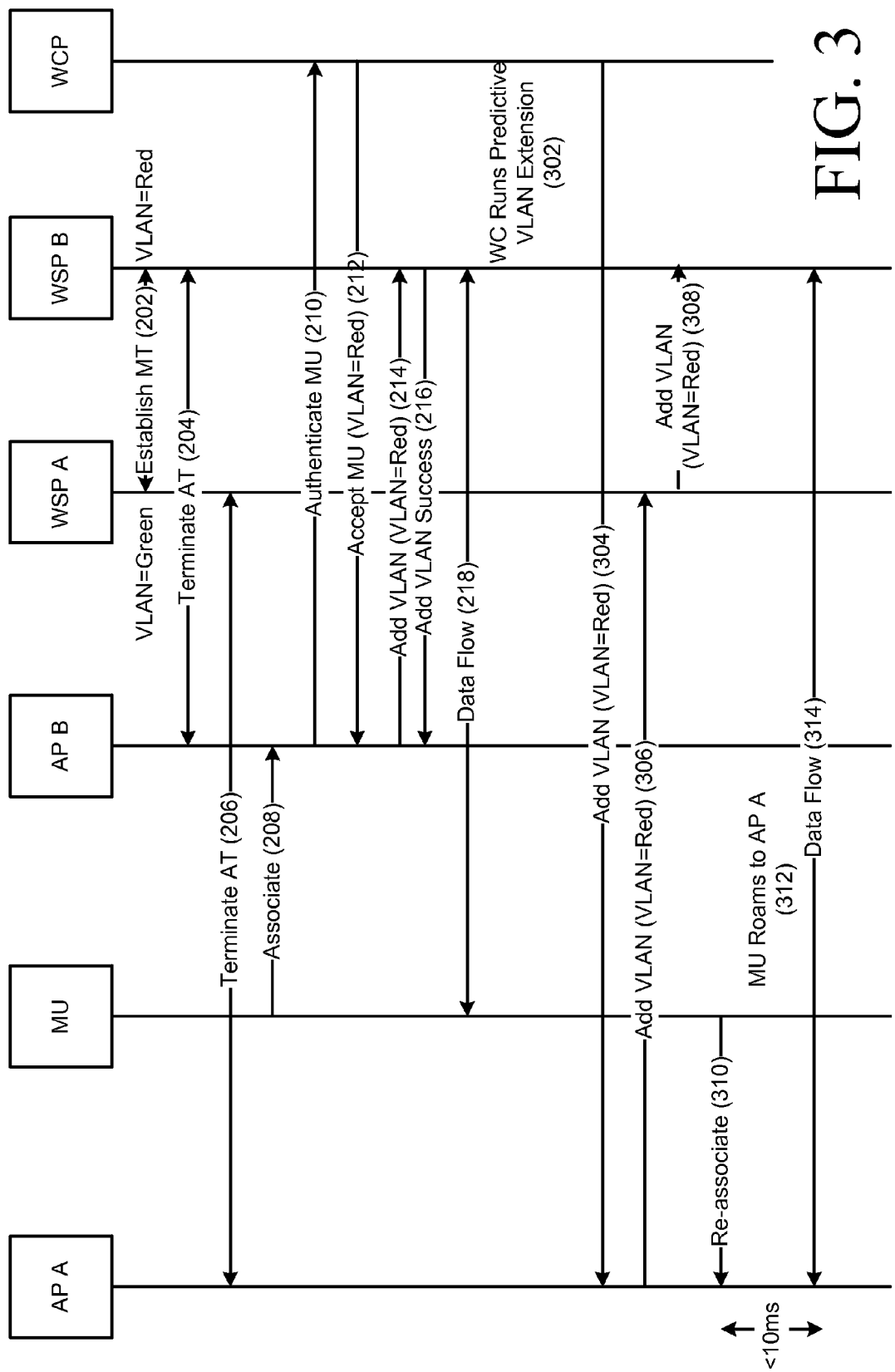
FIG. 3 is a diagram of VLAN extension with client mobility prediction in accordance with at least one implementation.

FIG. 3 is a diagram of VLAN extension with client mobility prediction. Steps 202-218 are the same or similar to 202-218 described above for FIG. 2.

At 302, the WC runs a predictive VLAN extension application. It is predicted that the MU may roam to AP A.

At 304, the WCP adds the Red VLAN to AP A.

At 306, AP A adds Red VLAN to WSP A.

At 308, WSP A connects to Red VLAN from WSP B.

At 310, MU re-associates with AP A (e.g., MU roams to AP A, 312).

At 314 data flows between WSP B and AP A.

In the example shown in FIG. 3, using an implementation of predictive VLAN extension, the time from roaming 310/312 to the start of data flow 314 is less than about 10 ms.

Figure 4:
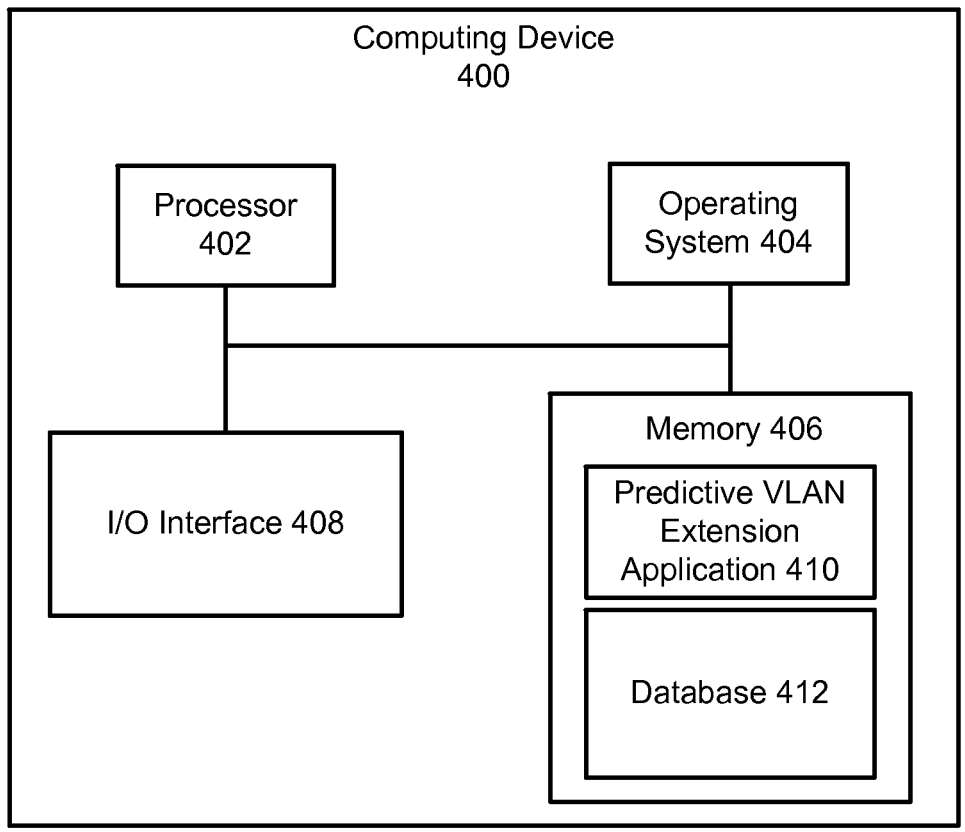
FIG. 4 is a diagram of an example computer system for predictive client VLAN extension in accordance with at least one implementation.

FIG. 4 is a diagram of an example computer system 400 in accordance with at least one implementation. The computer 400 includes a processor 402, operating system 404, memory 406 and I/O interface 408. The memory 406 can include an application for predictive client VLAN extension 410 and a database 412.

In operation, the processor 402 may execute the application 410 stored in the memory 406. The application 410 can include software instructions that, when executed by the processor, cause the processor to perform operations for predictive client VLAN extension in accordance with the present disclosure (e.g., performing one or more of the steps shown in FIG. 3).

The application program 410 can operate in conjunction with the database 412 and the operating system 404.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hardwired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for predictive client VLAN extension.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method for predictive VLAN extension, the method comprising:
   determining client movement within a wireless network domain;
   predicting one or more next hop access points for the client; and
   extending a client network to the one or more next hop access points prior to the client roaming to the one or more next hop access points,
   wherein predicting one or more next hop access points for the client is based on one or more of: RF neighbors of an access point to which the client is currently associated, access points to which the client is pre-authenticated, RF neighbor report, client location tracking and RSSI velocity and location tracking software.

2. The method of claim 1, wherein the client network includes a VLAN.

3. The method of claim 1, further comprising:
   identifying one or more active clients within the wireless network domain that may benefit from predictive VLAN extension,
   wherein the identifying includes one or more of:
      identifying any clients that support a fast roaming mechanism;
      a security mode configured for an SSID to which a client is connected; and
      identifying a non-sticky client that will roam.

4. The method of claim 3, further comprising:
   for each of the one or more active clients that may benefit from predictive VLAN extension, determining if a VLAN for that client needs to be extended based on one or more of received signal strength indication (RSSI) of a current access point of that client, an RSSI value of one or more neighboring access points and an RSSI velocity.

5. The method of claim 1, further comprising sending a message from a wireless controller to one or more next hop access points to extend a client VLAN.

6. The method of claim 1, further comprising programming, at one or more access points, an access tunnel and a mobility tunnel extension in a client VLAN, wherein the extension ages out and is removed if the client does not connect to the extension within a predetermined time period.

7. The method of claim 1, further comprising communicating the one or more next hop access points to the client.

8. The method of claim 1, further comprising communicating a next hop access point to the client.

9. A system comprising one or more processors configured to perform operations including:
   determining client movement within a wireless network domain;
   predicting one or more next hop access points for the client;
   extending a client VLAN network to the one or more next hop access points prior to the client roaming to the one or more next hop access points;
   identifying one or more active clients within the wireless network domain that may benefit from predictive VLAN extension, wherein the identifying includes one or more of:

identifying any clients that support a fast roaming mechanism;

a security mode configured for an SSID to which a client is connected; and identifying a non-sticky client that will roam;

for each of the one or more active clients that may benefit from predictive VLAN extension, determining if a VLAN for that client needs to be extended based on one or more of received signal strength indication (RSSI) of a current access point of that client, an RSSI value of one or more neighboring access points and an RSSI velocity, wherein predicting one or more next hop access points for the client is based on one or more of: RF neighbors of an access point to which the client is currently associated, access points to which the client is pre-authenticated, RF neighbor report, client location tracking and RSSI velocity and location tracking software.

10. The system of claim 9, wherein the operations further include programming, at one or more access points, an access tunnel and a mobility tunnel extension in a client VLAN, wherein the extension ages out and is removed if the client does not connect to the extension within a predetermined time period.

11. A nontransitory computer readable medium having stored thereon software instructions that, when executed by a processor, cause the processor to perform operations including:

determining client movement within a wireless network domain;

predicting one or more next hop access points for the client;

extending a client network to the one or more next hop access points prior to the client roaming to the one or more next hop access points; and programming, at one or more access points, an access tunnel and a mobility tunnel extension in a client VLAN, wherein the extension ages out and is removed if the client does not connect to the extension within a predetermined time period.

12. The nontransitory computer readable medium of claim 11, wherein the client network includes a VLAN.

13. The nontransitory computer readable medium of claim 11, wherein the operations further include:

identifying one or more active clients within the wireless network domain that may benefit from predictive VLAN extension, wherein the identifying includes one or more of:
identifying any clients that support a fast roaming mechanism;
a security mode configured for an SSID to which a client is connected; and
identifying a non-sticky client that will roam.

14. The nontransitory computer readable medium of claim 13, wherein the operations further include:

for each of the one or more active clients that may benefit from predictive VLAN extension, determining if a VLAN for that client needs to be extended based on one or more of received signal strength indication (RSSI) of a current access point of that client, an RSSI value of one or more neighboring access points and an RSSI velocity.

15. The nontransitory computer readable medium of claim 11, wherein predicting one or more next hop access points for the client is based on one or more of: RF neighbors of an access point to which the client is currently associated, access points to which the client is pre-authenticated, RF neighbor report, client location tracking and RSSI velocity and location tracking software.

16. The nontransitory computer readable medium of claim 11, wherein the operations further include sending a message from a wireless controller to one or more next hop access points to extend a client VLAN.

* * * * *